(12) United States Patent
Shibata

(10) Patent No.: US 7,477,411 B2
(45) Date of Patent: Jan. 13, 2009

(54) TRANSFER APPARATUS, IMAGE-PROCESSING APPARATUS, AND PROGRAM

(75) Inventor: Kouichi Shibata, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 745 days.

(21) Appl. No.: 10/939,424

(22) Filed: Sep. 14, 2004

(65) Prior Publication Data

US 2005/0206960 A1    Sep. 22, 2005

(30) Foreign Application Priority Data

Mar. 18, 2004    (JP)    ............. 2004-078907

(51) Int. Cl.
  *G06K 9/36*    (2006.01)
(52) U.S. Cl. .................. 358/1.15; 358/407; 358/448
(58) Field of Classification Search ........... 358/1.15, 358/407, 448, 1.13, 1.9
See application file for complete search history.

(56) References Cited

U.S. PATENT DOCUMENTS 6,744,528 B2 *    6/2004    Picoult et al. ............. 358/1.15

2001/0030761 A1*    10/2001    Ideyama .................. 358/1.9

FOREIGN PATENT DOCUMENTS

| EP | 1 102 473 A2 | 5/2001 |
|----|--------------|--------|
| JP | 06-350788 | 12/1994 |
| JP | 2000-013614 | 1/2000 |
| JP | 2001-211306 | 8/2001 |
| JP | 2003-348282 | 12/2003 |

OTHER PUBLICATIONS

Japanese Office Action dated May 9, 2006, with English translation.
Japanese Office Action with English translation.

* cited by examiner

*Primary Examiner*—Kimberly A Williams
(74) *Attorney, Agent, or Firm*—Buchanan Ingersoll & Rooney PC

(57) ABSTRACT

The transfer apparatus receives image data from the MFP (S11), and acquires processing information which indicates what data-processing has been performed on the image data by the MFP. Furthermore, the transfer apparatus performs additional processing on the image data based on the processing information and the destination (S12 and S15), and transmits this processed data to the destination (S13).

According to the composition described above, the transfer apparatus that reduces the processing load while achieving the intended purpose of data-processing can be provided.

15 Claims, 6 Drawing Sheets

FIG.2

| FIELD | ITEM | CONTENT |
|---|---|---|
| 1 | DESTINATION | (ADDRESS OF DESTINATION) |
| 2 | ENCRYPTION SYSTEM | ENCRYPTION SYSTEM B |
| 3 | REV. NO. OF ENCRYPTION SYSTEM | Rev 2.5 |
| 4 | ORIGINAL FILE FORMAT | JPEG |
| 5 | IMAGE DATA | (ENCRYPTED DATA) |

FIG.4A

| ENCRYPTION SYSTEM | MFP | TRANSFER APPARATUS |
|---|---|---|
| | ENCRYPTION SYSTEM B | ENCRYPTION SYSTEM B |
| REV. NO. OF ENCRYPTION SYSTEM | Rev 2.5 | Rev 2.6 |

FIG.4B

| ENCRYPTION SYSTEM | MFP | TRANSFER APPARATUS |
|---|---|---|
| | ENCRYPTION SYSTEM B | ENCRYPTION SYSTEM C |
| REV. NO. OF ENCRYPTION SYSTEM | Rev 2.5 | Rev 1.0 |

FIG.4C

| ENCRYPTION SYSTEM | MFP | TRANSFER APPARATUS |
|---|---|---|
| | — | ENCRYPTION SYSTEM C |
| REV. NO. OF ENCRYPTION SYSTEM | — | Rev 1.0 |

FIG.6

| FIELD | ITEM | CONTENT |
|---|---|---|
| 1 | DESTINATION | (ADDRESS OF DESTINATION) |
| 2 | BACKGROUND REMOVAL SYSTEM | BACKGROUND REMOVAL SYSTEM C |
| 3 | REV. NO. OF BACKGROUND REMOVAL SYSTEM | Rev 1.5 |
| 4 | ORIGINAL FILE FORMAT | JPEG |
| 5 | IMAGE DATA | (DATA) |

TRANSFER APPARATUS, IMAGE-PROCESSING APPARATUS, AND PROGRAM

This application is based on application No.2004-078907 filed in Japan, the contents of which are hereby incorporated by reference.

BACKGROUND OF THE INVENTION (1) Field of the Invention

The present invention relates to a transfer apparatus that transfers data, sent from an image-processing apparatus as represented by an MFP (Multi Function Peripheral), to a destination device, and an image-processing apparatus.

(2) Description of the Related Art

A system that transmits image data read by the MFP to a target device via a transfer apparatus, such as a mail server, has been used thus far. Among some transfer apparatuses, there is a model that encrypts the image data and transfers this encrypted image data in order to assure security.

The major load is applied to the transfer apparatus in order to perform encryption-processing since the volume of information of image data is generally as large as several MB (megabytes). Then for example, Japanese Laid-Open Patent Application No. 2000-13614 proposes a technology used in the case of transferring medical image data. There, while patients' privacy is protected, the processing load of encryption is reduced by encrypting only additional data, such as names of patients, appended to the image data, and leaving the image data itself unencrypted.

However, image data, not only limited to medical images, may be transmitted via a network having high security risks, such as the Internet. In such a case, the above prior art provides protection of privacy, yet does not assure security since the image data itself is not encrypted. In other words, assuring security by encryption, which is the intended purpose of data-processing, is not always achieved.

In addition, another problem arises where uniform security-processing is performed on data transmitted via the Internet that has high security risks and data transmitted only via a LAN within a firewall where the security risks are low. In this case, security of transmission via the Internet is assured when the security level is raised (i.e. when intensive encryption-processing is carried out). However, the performance specification of the security-processing becomes excessive for data transmission only via a LAN, which results in an overload of the encryption-processing.

On the other hand, when the security level is lowered (i.e. when less intensive encryption-processing or no encryption-processing is carried out), the load of security-processing is lightened for data transmission only via a LAN. However, in the case of data transmission via the Internet, this results in an increase in security risks.

Not only on the security-processing but also much the same is true on image-processing like denoising process for image data. For example, a sender wants to transmit an image with low-level noise in the case when the receiver of the image data is a person outside the company, however the sender wants to transmit the image data promptly to a person inside the company even if the image has some noise. In such a case, if uniform image-processing is performed on image data, both to the internal and to the external, less intensive noise processing results in a poor image being sent to a person outside the company, while intensive noise processing leads to an overload of the image-processing.

SUMMARY OF THE INVENTION

Consequentially, the present invention aims to provide a transfer apparatus, an image-processing apparatus, and a program which perform data-processing, such as security-processing and image-processing, depending on a destination of data to be sent.

In order to solve the above issues, the transfer apparatus of the present invention which transfers data sent from the image-processing apparatus comprises: a receiving unit, a determining unit, a processing unit, and a transmitting unit. The receiving unit is operable to receive the data from the image-processing apparatus. The determining unit is operable to determine data-processing to be applied to the received data depending on a destination of the received data. The processing unit is operable to apply the determined data-processing to the received data. The transmitting unit is operable to transmit to the destination the data to which the determined data-processing has been applied.

According to the composition described above, the transfer apparatus applies data-processing depending on the destination. Thus, since the data-processing is performed depending on the destination, the transfer apparatus reduces the processing load by excluding unnecessary data-processing while achieving the intended purpose of the data-processing (for example, assuring security in the case of encryption-processing, and improving image quality in the case of image-processing), relative to the case in which data-processing is uniformly performed regardless of the destination.

Furthermore, the data-processing may be security-processing or image-processing.

Here, the security-processing includes encryption-processing, a digital signature attachment, and a digital certificate attachment, while the image-processing includes background removal, auto-skew correction, auto-orientation, and show-through correction. Herewith, the transfer apparatus can assure security or improve image quality of the data to be sent.

The determining unit may determine, when the destination belongs to a predetermined group, data-processing requiring less processing load, compared to the case when the destination does not belong to the predetermined group.

When an Intranet, for example, is selected as the predetermined group, the transfer apparatus applies the data-processing requiring less processing load to the data to be sent to a device belonging to the Intranet, which results in reducing the processing load by the equivalent amount. Note that, in this specification, 'Intranet' means a LAN (Local Area Network) within a firewall.

The less processing load may include no processing load.

Data-processing requiring no processing load means namely applying no data-processing. This results in the maximum reduction in processing load.

The transfer apparatus may further comprise an acquiring unit operable to acquire processing information that indicates what data-processing has been applied to the data by the image-processing apparatus. The processing unit may comprise a first and a second decision unit. While the first decision unit decides what data-processing should be applied to the received data depending on the destination, the second decision unit decides the difference between the data-processing decided by the first decision unit and the data-processing indicated by the processing information as the data-processing to be applied to the received data.

According to the composition described above, if enough data-processing has already been implemented, then the data-processing is not applied. On the other hand, when the already implemented data-processing is not sufficient, additional processing will be applied to the received data in order to compensate for the insufficiency. Herewith, the transfer apparatus reduces the processing load by excluding unnecessary data-processing while achieving the intended purpose of the data-processing.

In order to solve the issues cited above, the image-processing apparatus of the present invention, which reads data from an original source, comprises: an accepting unit, a determining unit, a processing unit, and a transmitting unit. The accepting unit is operable to accept a designation of the destination. The determining unit is operable to determine data-processing to be applied to the data depending on the accepted destination. The processing unit is operable to apply the determined data-processing to the data. The transmitting unit is operable to transmit to the accepted destination the data to which the determined data-processing has been applied.

According to the composition described above, the image-processing apparatus performs data-processing depending on the accepted destination. That is, since the data-processing is implemented if required, the image-processing apparatus reduces the processing load by excluding unnecessary data-processing while achieving the intended purpose of the data-processing.

The data-processing may be security-processing or image-processing.

Here, the security-processing includes encryption-processing, a digital signature attachment, and a digital certificate attachment, while the image-processing includes background removal, auto-skew correction, auto-orientation and show-through correction. Herewith, the image-processing apparatus can assure security or improve image quality of the data to be sent.

The determining unit may determine, when the destination belongs to a predetermined group, data-processing requiring less processing load, compared to the case when the destination does not belong to the predetermined group.

When an Intranet, for example, is selected as the predetermined group, the image-processing apparatus applies the data-processing requiring less processing load to the data to be sent to a device belonging to the Intranet, which results in reducing the processing load by the equivalent amount.

Moreover, the less processing load may include no processing load.

Data-processing requiring no processing load means namely applying no data-processing. This results in the maximum reduction in processing load.

The program of the present invention activating a transfer apparatus, which transfers data sent from an image-processing apparatus, comprises: a receiving step, a determining step, a processing step, and a transmitting step. The receiving step is a step of receiving data from the image-processing apparatus. The determining step is a step of determining data-processing to be applied to the received data depending on a destination of the received data. The processing step is a step of applying the determined data-processing to the received data. The transmitting step is a step of transmitting to the destination the data to which the determined data-processing has been applied.

A computer implemented with the program having the above composition achieves the same effect as the transfer apparatus discussed above.

The program of the present invention activating an image-processing apparatus, which reads data from an original source, comprises: an accepting step, a determining step, a processing step, and a transmitting step. The accepting step is a step of accepting the designation of the destination. The determining step is a step of determining data-processing to be applied to the data depending on the accepted destination. The processing step is a step of applying the determined data-processing to the data. The transmitting step is a step of transmitting to the accepted destination the data to which the determined data-processing has been applied.

A computer implemented with the program having the above composition achieves the same effect as the image-processing apparatus discussed above.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a table showing the configuration of the image data sent from the MFP 1;

FIG. 4 is a table showing examples of the encryption systems for the MFP 1 and the transfer apparatus 2;

FIG. 6 is a table showing the configuration of the image data sent from the MFP 1.

DESCRIPTION OF THE PREFERRED EMBODIMENT

The following gives a detailed account of the best embodiment of the present invention by the aid of drawings.

First Embodiment

Figure 1:
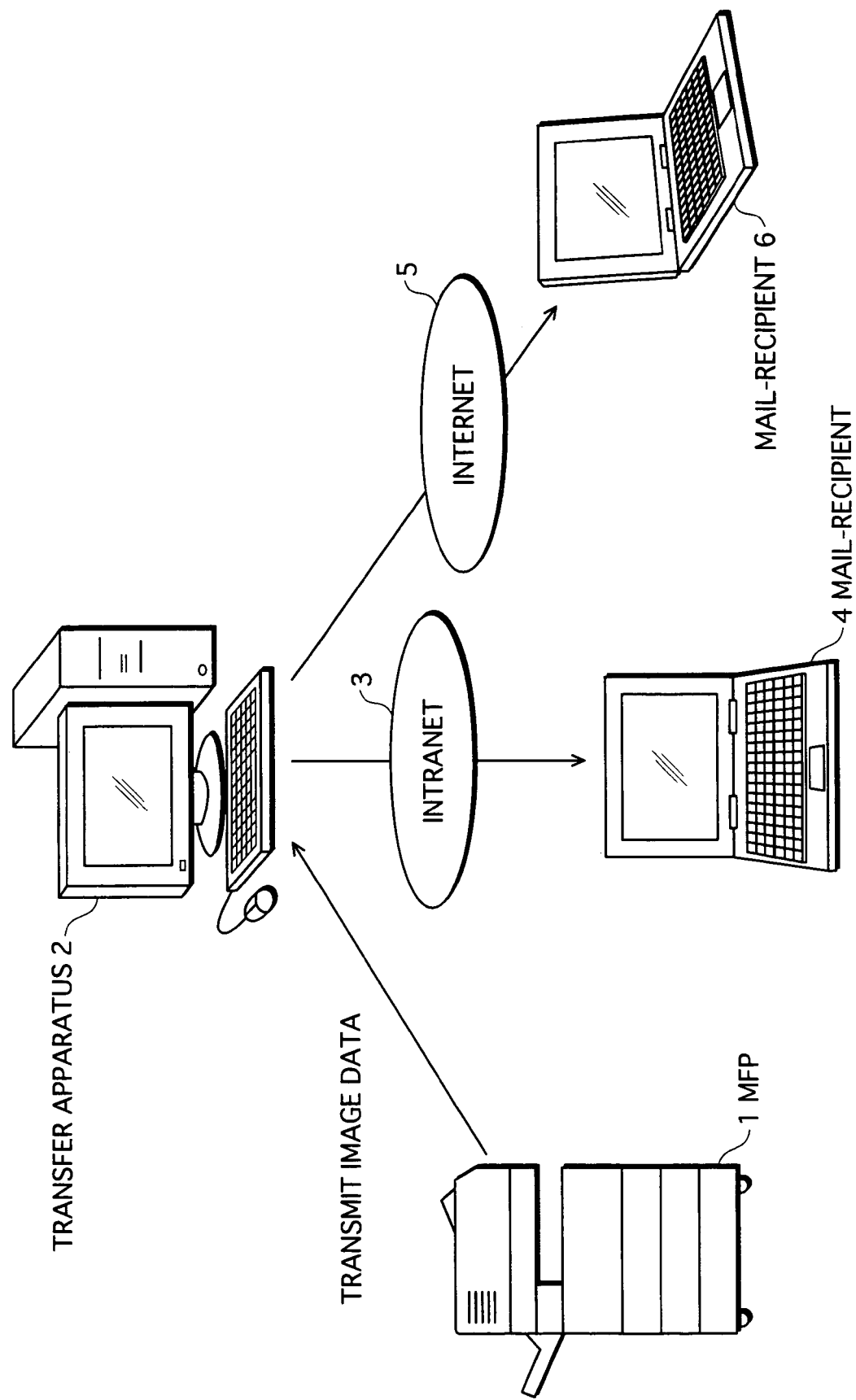
FIG. 1 illustrates the structure of the image data transmitting system.

FIG. 1 illustrates the structure of the image data transmitting system.

The image data transmitting system comprises: an MFP (Multi Function Peripheral) 1, a transfer apparatus 2, an Intranet 3, a mail-recipient 4, the Internet 5, and a mail-recipient 6.

The MFP 1 includes a reading function of reading image data, a processing function of applying data-processing to the image data, and a transmitting function of transmitting the image data to the device of the destination which a user has designated. These functions are realized by a CPU, which is provided in the MFP 1, executing programs stored in the ROM or RAM. The following is viewed as transmission ways employed by the transmitting function: (1) transmission of a file attached to an e-mail; and (2) transmission using an FTP (File Transfer Protocol).

The transfer apparatus 2 has a transfer function of transferring the image data from the MFP 1 to the device of the destination. The device of the destination is, for instance, a device on the Intranet 3 as in the case of the mail-recipient 4, or a device on the Internet 5 as in the case of the mail-recipient 6. Furthermore, the transfer apparatus 2 has a function of determining whether to perform additional processing (data-processing) or not depending on the data-processing applied by the MFP 1 and the destination, on receiving the image data sent from the MFP 1. These functions are realized by a CPU, which is provided in the transfer apparatus 2, executing programs stored in the ROM or RAM. Note here that programs for respective functions are provided as application software which runs on the OS.

An account of the first embodiment is given assuming that the data-processing applied by the MFP 1 and the transfer apparatus 2 is encryption-processing.

FIG. 2 is a table showing the configuration of the image data sent from the MFP 1.

The fields from the first to the fourth shown in the table of FIG. 2 make up the header part of the image data, while the fifth field is the main part. By means of the header part, the transfer apparatus 2 can identify that the original file format of the image data is JPEG, and that this file has been encrypted using the encryption system B, Revision Number (hereafter, Rev. No.) 2.5.

Figure 3:
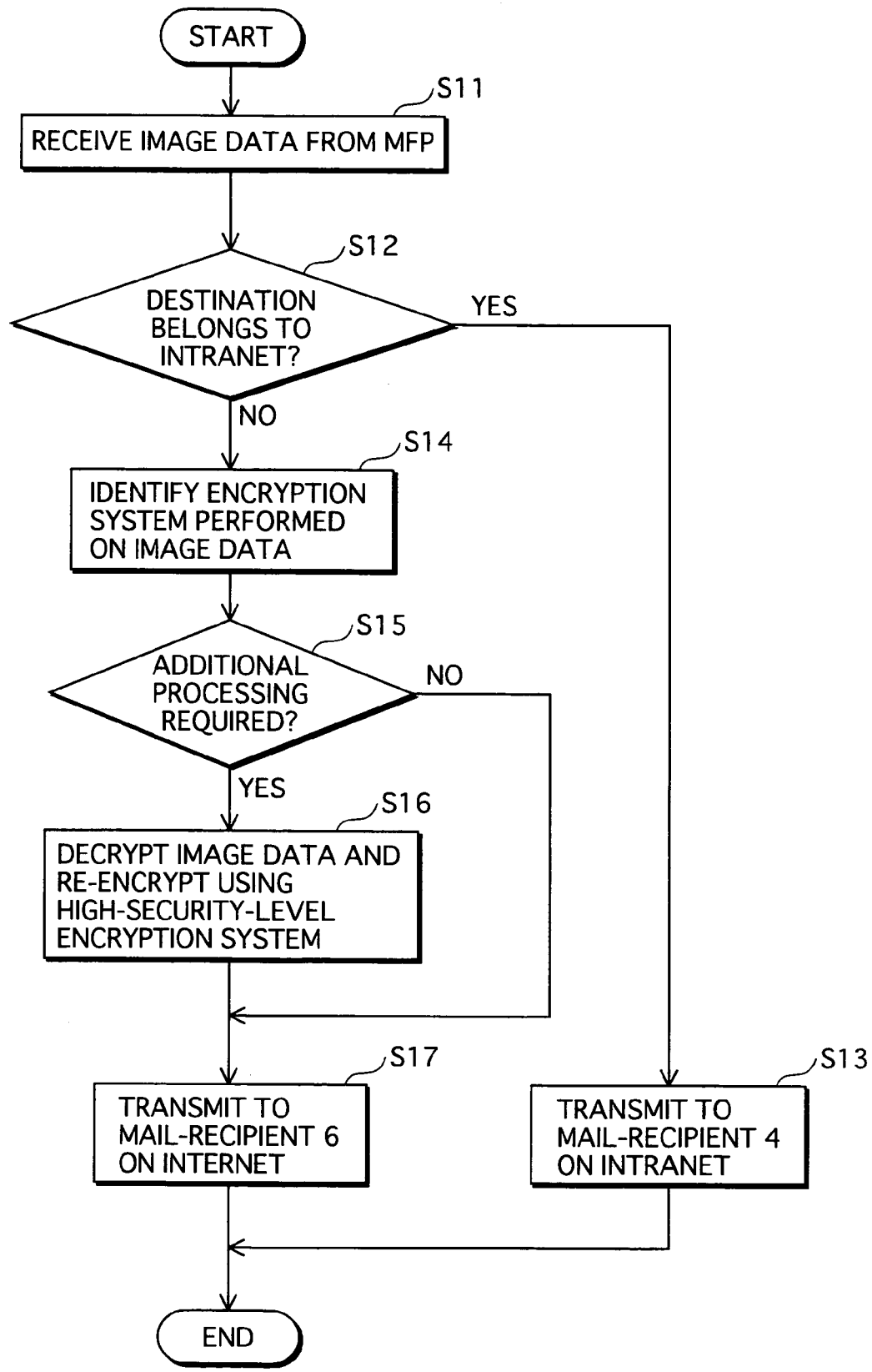
FIG. 3 is a flowchart illustrating operations performed when the transfer apparatus 2 transfers the data sent from the MFP 1.

FIG. 3 is a flowchart illustrating operations performed when the transfer apparatus 2 transfers the data sent from the MFP 1.

The transfer apparatus 2 receives the image data from the MFP 1 (step S11). To this image data, the header part shown in FIG. 2 is attached. By means of these header part, the transfer apparatus 2 can identify the mail address of the device of the destination.

Using the mail address, the transfer apparatus 2 determines whether the device of the destination belongs to the Intranet 3 (step S12).

If the device of the destination belongs to the Intranet 3 (step S12: Yes), the transfer apparatus 2 transmits the image data sent from the MFP 1 to the mail-recipient 4 on the Intranet 3 without performing any encryption processing (step S13). In general, less intensive security-processing requires less processing load. Given this factor, this preferred embodiment assumes that the image data from the MFP 1 is transmitted with no encryption processing applied when the device of the destination belongs to the Intranet 3. However, a lower level of security-processing relative to the one implemented in step S16 may be performed instead. This case will be described hereinafter.

If the device of the destination does not belong to the Intranet 3 (step S12: No), the transfer apparatus 2 identifies the encryption system applied to the image data (step S14). This is identified by reference to the second and third fields of the image data shown in FIG. 2.

The transfer apparatus 2 determines the necessity of additional processing (step S15). This is determined by whether the encryption system applied by the transfer apparatus 2 has higher security than that applied by the MFP 1.

FIG. 4 is a table showing examples of the encryption systems for the MFP 1 and the transfer apparatus 2.

FIG. 4A indicates that the MFP 1 is able to perform the encryption system B, Rev. No. 2.5, while the transfer apparatus 2 is able to perform the encryption system B, Rev. No. 2.6. That is, although the encryption system B has been revised, the MFP 1 performs encryption using the preceding revised version. Accordingly, the transfer apparatus 2 determines that additional processing is necessary. Contrarily, the transfer apparatus 2 determines that there is no need to perform additional processing if Rev. Nos. of the MFP 1 and the transfer apparatus 2 are the same.

FIG. 4B indicates that the MFP 1 is able to perform the encryption system B, Rev. No. 2.5, while the transfer apparatus 2 is able to perform the encryption system C, Rev. No. 1.0. Here, suppose that the security level of the encryption system C is higher than that of the encryption system B. In this case, the transfer apparatus 2 determines that additional processing is necessary.

FIG. 4C indicates that the MFP 1 has not performed any encryption-processing. In this case, the transfer apparatus 2 determines that additional processing is necessary.

When it is determined that additional processing is required (step S15: Yes), the transfer apparatus 2 decrypts the encrypted image data, and once again encrypts the decrypted image data using the encryption system that the transfer apparatus 2 is able to perform (step S16).

When it is determined that additional processing is not necessary (step S15: No), the transfer apparatus 2 does not perform any additional processing on the image data.

The transfer apparatus 2 transmits the image data to the mail-recipient 6 on the Internet 5 (step S17).

Thus, since performing the encryption-processing depending on the destination, the transfer apparatus 2 reduces the processing load by excluding unnecessary encryption-processing while achieving the intended purpose of the encryption-processing, namely assuring security.

In addition, the transfer apparatus 2 does not perform the encryption-processing if the device of the destination belongs to the Intranet 3. This is because the necessity of assuring security for image data to be sent to devices belonging to an Intranet 3 is generally low. On the other hand, the transfer apparatus 2 performs additional encryption-processing when the device of the destination does not belong to the Intranet 3. This allows for assuring security for the image data to be sent to the device which does not belong to the Intranet 3.

Second Embodiment

The first embodiment is organized in such a manner that the transfer apparatus 2 applies additional processing to the image data transmitted from the MFP 1 depending on the destination. However, the second embodiment differs from the first embodiment in that the MFP 1 itself performs the data-processing depending on the destination.

Here, the second embodiment is explained assuming that the data-processing to be applied is a type of image-processing, background removal. The description of the system composition will be left out since it is the same as in the first embodiment.

Figure 5:
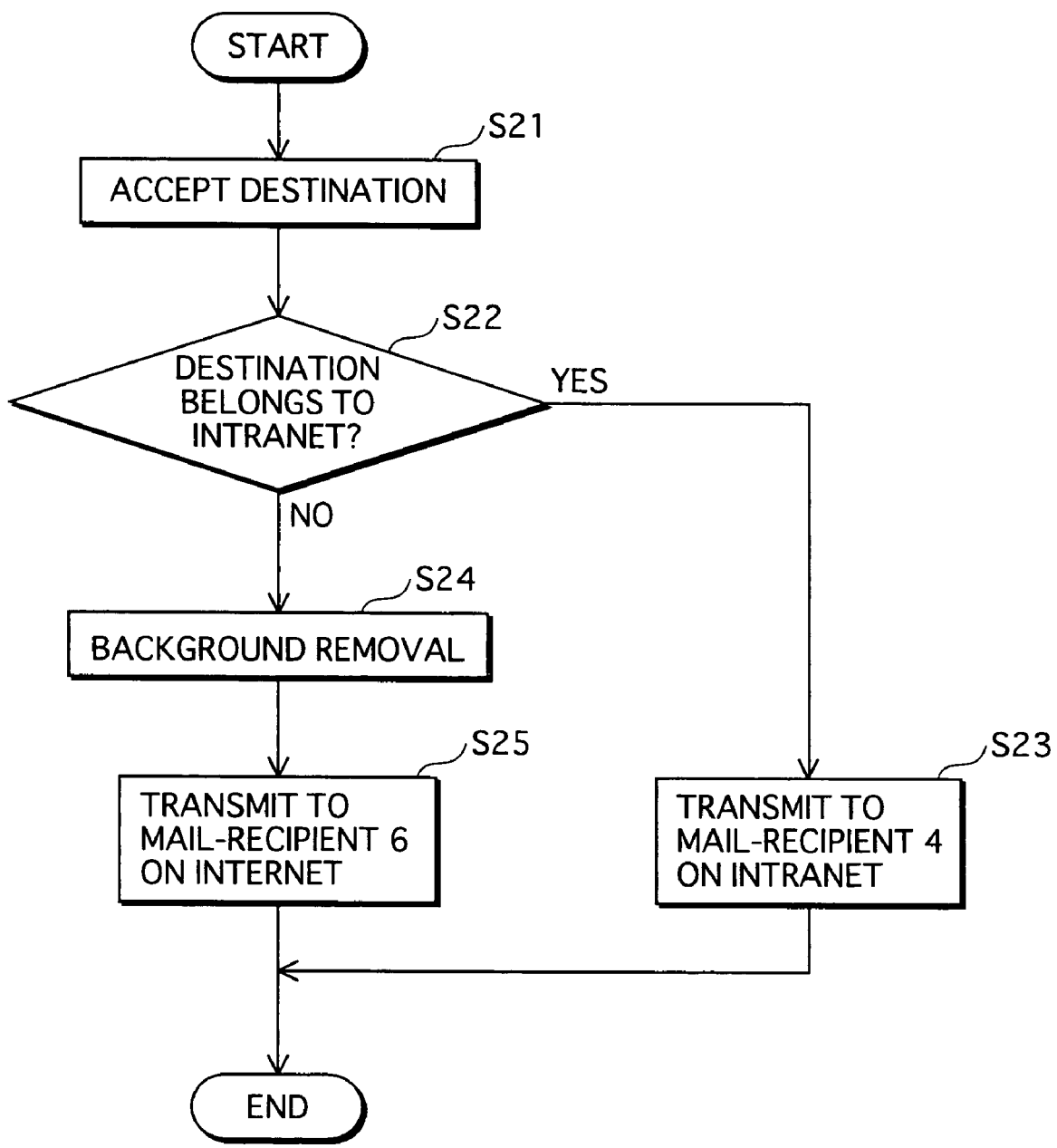
FIG. 5 is a flowchart illustrating operations performed when the MFP 1 transmits the data.

FIG. 5 is a flowchart illustrating operations performed when the MFP 1 transmits the data.

The MFP 1 accepts a designation of the destination from a user (step S21).

The MFP 1 determines whether the device of the destination belongs to the Intranet 3 (step S22). This is determined by whether the domain name of the mail address of the destination corresponds to the domain name of the mail server that belongs to the Intranet 3.

When the device of the destination belongs to the Intranet 3 (step S22: Yes), the MFP 1 transmits the image data to the mail-recipient 4 on the Intranet 3 without any background removal processing applied (step S23).

If the device of the destination does not belong to the Intranet 3 (step S22: No), the MFP 1 applies background removal to the image data (step S24).

The transfer apparatus 2 transmits the image data to the mail-recipient 6 on the Internet 5 (step S25).

Thus, since applying the background removal if required, the MFP 1 reduces the processing load by excluding unnecessary background removal while achieving the intended purpose of the image-processing, namely improving image quality.

In addition, the MFP 1 does not apply the background removal if the device of the destination belongs to the Intranet 3. This is because the necessity of improving the quality of image data to be sent to devices on an Intranet 3 is generally low. On the other hand, the MFP 1 applies additional background removal when the device of the destination does not belong to the Intranet 3. This allows for improving the quality of image data to be sent to the device that does not belong to the Intranet 3.

Modifications (1) In the first and second embodiments, the necessity of additional processing is determined by whether the device of the destination belongs to the Intranet 3. This is because it is often the case that the necessity of additional processing significantly differs by whether the device of the destination belongs to an Intranet 3 as described above. However, the present invention is not limited to this and can employ different criteria. For instance, the user, in advance, registers the device of the destination that requires additional processing on the data to be sent, and the necessity of additional processing may be determined based on this.

(2) In the first and second embodiments, the transfer apparatus 2 every time acquires process information, which indicates what data-processing has been applied to the data by the MFP 1, along with the data. However, the present invention is not confined to this. For example, in addition to the data, the transfer apparatus 2 may acquire performance information indicating the performance of the MFP 1 for data-processing. Means to acquire the performance information can be: (a) having the MFP 1 give periodic notices; and (b) enquiring the MFP 1 when needed.

(3) Although the first and second embodiments are based on the assumption that the image data is transmitted by e-mail, the present invention is not limited to this and may use communications protocols such as an FTP (File Transfer Protocol) In the case of FTP, whether the device of the destination belongs to the Intranet 3 is determined by if the network part within the IP address of the destination corresponds to the network address of the Intranet 3 or not.

(4) Although being described as the encryption-processing in the first embodiment, the data-processing could be other security-processing, for example, a digital signature attachment and a digital certificate attachment. Furthermore, the data-processing may also be image-processing, including background removal, auto-skew correction, auto-orientation, and show-through correction.

In the case that the data-processing is image-processing, the image data sent from the MFP 1 will be as follows.

FIG. 6 is a table showing the configuration of the image data sent from the MFP 1.

The fields from the first to the fourth shown in FIG. 6 make up the header part, while the fifth field is the main part of the image data. By means of the header part, the transfer apparatus 2 can identify that the original file format of the image data is JPEG, and that this file has been corrected using the background removal system C, Rev. No. 1.5.

In addition, each step shown in FIG. 3 is altered as follows.

Step S14: When the device of the destination does not belong to the Intranet 3, the transfer apparatus 2 identifies the system of the background removal.

Step S15: The transfer apparatus 2 determines whether additional processing is necessary or not based on the system of the background removal and the Rev. No. shown in FIG. 6. Whether additional processing is required or not is determined by if the background removal system applied by the transfer apparatus 2 has higher correction quality than that applied by the MFP 1.

Step S16: When it is determined that additional processing is necessary, the transfer apparatus 2 performs the background removal that the transfer apparatus 2 is able to do so.

(5) Although being described as the background removal in the second embodiment, the data-processing could be other image-processing, for example, auto-skew correction, auto-orientation, and show-through correction. Furthermore, the data-processing may also be security-processing, for example, encryption-processing, a digital signature attachment, and a digital certificate attachment.

In the second embodiment, the data-processing (i.e. background removal) is not implemented if the device of the destination does not belong to the Intranet 3. However, the background removal requiring less processing load, compared to the one implemented in step S24, may be performed instead. In addition, if it is desired to perform security-processing in the second embodiment, it can be done in the same manner as described in the first embodiment. Alternatively, the security-processing can be performed by varying the security level as discussed below.

(6) By not performing the data-processing, the first embodiment reduces the processing load by the equivalent amount. However, if the security level of encryption is low, generally the processing load is also small. Therefore, relative to the case in which an encryption of a high security level is uniformly performed, the processing load is still reduced even if encryption is applied to the data to be sent to the device on the Intranet 3 as long as the security level of the encryption is lower than that applied to the data to be sent to the device on the Internet. Furthermore, likewise in the second embodiment, relative to the case in which background removal of high correction quality is uniformly performed, the processing load is reduced even if background removal is applied to the data to be sent to the device on the Intranet 3 as long as the correction quality is lower than that applied to the data to be sent to the device on the Internet.

(7) In the first embodiment, when the image-processing is performed as the data-processing, the step S12 can be omitted, where whether the device of the destination belongs to the Intranet 3 or not is determined. Herewith, the device belonging to the Intranet 3 can also acquire high quality image data.

Note here that it is thought that the first embodiment has the following advantages over the second embodiment.

(a) In general, data processing performance of the MFP 1 is lower than that of the transfer apparatus 2. Therefore, employing the first embodiment allows for sharing the load of the data-processing.

(b) In general, the transfer apparatus carries an OS and actualizes various types of functions using application software. Therefore, the transfer apparatus has significant flexibility in adding and updating functions. On the other hand, the MFP 1 generally actualizes the data-processing using firmware. The major load is applied to the firmware to add and update functions. This is because a chain reaction may occur when a part of the firmware is altered. In turn the partial change of the firmware causes the need to alter another part. Hence the load of updating the firmware of the MFP 1 can be reduced by having the transfer apparatus 2 take on a function that the MFP 1 does not support.

(8) In the first embodiment, when it is determined that additional processing is required, the transfer apparatus decrypts the image data, and once again encrypts the image data using an encryption system with a higher security level. However, the present invention is not limited to this. For example, if only the versions of the encryption system are different as in the case shown in FIG. 4A, then just the data-processing of the difference between those two versions can be performed as the data-processing to be applied to the image data.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transfer apparatus which transfers data sent from an image-processing apparatus, comprising:
    a receiving part operable to receive the data from the image-processing apparatus;
    a determining part operable to determine whether or not to apply a predetermined data-processing to the received data based on the transfer destination of the received data;
    a judging part operable to judge whether or not to apply an additional data-processing concerning said predetermined data-processing to the received data based on a condition of the received data;
    a processor operable to apply the additional data-processing to the received data when (a) the predetermined data-processing is determined to be applied and (b) the additional data-processing is judged to be applied; and
    a transmitter operable to transmit to the destination the data to which the additional data-processing has been applied.

2. The transfer apparatus of claim 1, wherein the data-processing is security-processing or image-processing.

3. The transfer apparatus of claim 1, wherein the determining part determines, when the destination belongs to a predetermined group, data-processing requiring less processing load, compared to a case when the destination does not belong to the predetermined group.

4. The transfer apparatus of claim 3, wherein the less processing load includes no processing load.

5. The transfer apparatus of claim 1 further comprising:
    an acquiring unit operable to acquire processing information that indicates what data-processing has been applied to the data by the image-processing apparatus; wherein
    the determining part includes:
    a first decision unit operable to decide what data-processing should be applied to the received data depending on the destination; and
    a second decision unit operable to decide a difference between the data-processing decided by the first decision unit and the data-processing indicated by the processing information as the data-processing to be applied to the received data.

6. The transfer apparatus of claim 1, wherein the determining part determines to apply the predetermined data processing when the determining part determines that it is necessary to apply the predetermined data processing.

7. An image-processing apparatus which reads data from an original source, comprising:
    an accepting part operable to accept a designation of a transmission destination of the read data;
    a determining part operable to determine whether or not to apply a predetermined data-processing to the read data based on the accepted transfer destination of the read data;
    a judging part operable to judge whether or not to apply an additional data-processing concerning said predetermined data-processing to the read data based on a condition of the read data;
    a processor operable to apply the additional data-processing to the read data when (a) the predetermined data-processing is determined to be applied and (b) the additional data-processing is judged to be applied; and
    a transmitter operable to transmit to the destination the data to which the additional data-processing has been applied.

8. The image-processing apparatus of claim 7, wherein the determining part determines, when the destination belongs to a predetermined group, data-processing requiring less processing load, compared to a case when the destination does not belong to the predetermined group.

9. The image-processing apparatus of claim 8, wherein the less processing load includes no processing load.

10. The image-processing apparatus of claim 7, wherein the data-processing is security-processing or image-processing.

11. The image processing apparatus of claim 7, wherein the determining part determines to apply the predetermined data processing when the determining part determines that it is necessary to apply the predetermined data processing.

12. A program embodied on a computer readable medium for driving a transfer apparatus which transfers data sent from an image-processing apparatus to perform a method comprising:
    receiving the data from the image-processing apparatus;
    determining whether or not to apply a predetermined data-processing to the received data based on the transfer destination of the received data;
    judging whether or not to apply an additional data-processing concerning said predetermined data-processing to the received data based on a condition of the received data;
    applying the additional data-processing to the received data when (a) the predetermined data-processing is determined to be applied and (b) the additional data-processing is judged to be applied; and
    a transmitting to the destination the data to which the additional data-processing has been applied.

13. The program of claim 12, wherein a determination is made to apply the predetermined data processing when it is necessary to apply the predetermined data processing.

14. A program embodied on a computer readable medium for driving an image-processing apparatus which reads data from an original source to perform a method comprising:
    accepting a designation of a transmission destination of the read data;
    determining whether or not to apply a predetermined data-processing to the read data based on the accepted transfer destination of the read data;
    judging whether or not to apply an additional data-processing concerning said predetermined data-processing to the read data based on a condition of the read data;
    applying the additional data-processing to the read data when (a) the predetermined data-processing is determined to be applied and (b) the additional data-processing is judged to be applied; and
    transmitting to the accepted destination the data to which the additional data-processing has been applied.

15. The program of claim 14, wherein a determination is made to apply the predetermined data processing when it is necessary to apply the predetermined data processing.

* * * * *